(12) United States Patent
Odaka et al.

(10) Patent No.: US 8,629,907 B2
(45) Date of Patent: Jan. 14, 2014

(54) DATA ACQUISITION SYSTEM AND TRANSMISSION CONTROL DEVICE

(75) Inventors: Toshiyuki Odaka, Fuchu (JP);
Kunihiko Toumura, Hachioji (JP);
Mariko Nakayama, Tokyo (JP);
Atsushi Hiroike, Kawagoe (JP);
Tatsuhiko Kagehiro, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 1018 days.

(21) Appl. No.: 12/697,492

(22) Filed: Feb. 1, 2010

(65) Prior Publication Data

US 2010/0194894 A1 Aug. 5, 2010

(30) Foreign Application Priority Data

Feb. 5, 2009 (JP) .................................. 2009-025047

(51) Int. Cl.
*H04N 7/18* (2006.01)
*G06K 9/00* (2006.01)

(52) U.S. Cl.
USPC .............................. 348/159; 348/143; 382/107

(58) Field of Classification Search
None
See application file for complete search history.

(56) References Cited

U.S. PATENT DOCUMENTS

| | | | |
|---|---|---|---|
| 6,597,389 B2 * | 7/2003 | Tanaka et al. .............. | 348/14.08 |
| 6,813,312 B2 * | 11/2004 | Tullberg et al. ........... | 375/240.01 |
| 2003/0191848 A1 * | 10/2003 | Hesselink et al. ........... | 709/229 |
| 2007/0130599 A1 * | 6/2007 | Monroe ........................ | 725/105 |
| 2007/0177015 A1 * | 8/2007 | Arakawa et al. ............. | 348/159 |
| 2007/0216781 A1 * | 9/2007 | Miyanohara .............. | 348/231.99 |
| 2007/0268367 A1 * | 11/2007 | Agmon ......................... | 348/143 |
| 2008/0159597 A1 * | 7/2008 | Noguchi et al. .............. | 382/107 |
| 2009/0275287 A1 * | 11/2009 | Renkis ........................ | 455/63.1 |

FOREIGN PATENT DOCUMENTS

| | | |
|---|---|---|
| JP | 2002-262273 A | 9/2002 |
| JP | 2002-351438 A | 12/2002 |
| JP | 2008-205669 A | 9/2008 |

OTHER PUBLICATIONS

K. Toumura et al., Traffic Control Method for Large-scale Monitoring Systems, The Papers of Technical Meeting on Communications, IEE Japan, CMN-08-14, May 22-23, 2008.

* cited by examiner

*Primary Examiner* — Scott Christensen
*Assistant Examiner* — Joiya M Cloud
(74) *Attorney, Agent, or Firm* — Mattingly & Malur, PC

(57) ABSTRACT

A transmit-side transmission control device for sending data generated by a data generator device to a data utilization point receives and retains notification of the allowable data transmission quantity from a receive-side transmission control device, and adjusts the data quantity sent from the data generator device so as to fit within that allowable data transmission quantity range, and/or when a request is issued to change that data transmission quantity, the receive-side transmission control device is notified of that allowable data transmission quantity change request. The receive-side transmission control device retains the respective allowable data transmission quantities for transmit-side transmission control device, and when a change request is issued, reallocates the allowable data transmission quantities for all transmit-side transmission control devices to fit within the data processing load range stored beforehand within the data utilization point, and notifies the corresponding transmit-side transmission control device of these reallocated allowable data transmission quantities.

17 Claims, 11 Drawing Sheets

| DATA GENERATOR DEVICE ID (CAMERA ID) | TRANSMISSION REQUEST DATA QUANTITY [kbps] | TRANSMISSION REQUEST PRIORITY | TRANSMISSION REQUEST PERIOD |
|---|---|---|---|
| Camera101 | 500 | 100 | 2008-09-20-12-00-00 |
| Camera103 | 200 | 50 | — |
| Camera102 | 50 | 20 | — |
| ⋮ | ⋮ | ⋮ | ⋮ |

FIG. 7A
DATA GENERATOR DEVICE LIST  203-1

| TRANSMIT-SIDE TRANSMISSION CONTROL DEVICE ID | DATA GENERATOR DEVICE ID (CAMERA ID) | TRANSMISSION REQUEST DATA QUANTITY [kbps] | TRANSMISSION REQUEST PRIORITY | TRANSMISSION REQUEST PERIOD |
|---|---|---|---|---|
| TC1 | Camera101 | 500 | 100 | 2008-09-20-12-00-00 |
| TC1 | Camera102 | 50 | 20 | — |
| TC1 | Camera103 | 200 | 50 | — |
| TC2 | Camera204 | 80 | 20 | — |
| TC2 | Camera205 | 40 | 00 | — |
| TC3 | Camera306 | 180 | 50 | — |
| : | : | : | : | : |

FIG. 7B
TRANSMIT-SIDE TRANSMISSION CONTROL DEVICE LIST  203-2

| TRANSMIT-SIDE TRANSMISSION CONTROL DEVICE ID | TRANSMISSION REQUEST DATA QUANTITY [kbps] | TRANSMISSION REQUEST PRIORITY | TRANSMISSION REQUEST PERIOD |
|---|---|---|---|
| TC1 | 750 | 100 | 2008-09-20-12-00-00 |
| TC2 | 120 | 50 | — |
| TC3 | 180 | 50 | — |
| : | : | : | : |

FIG. 8

| # | TRANSMIT-SIDE TRANSMISSION CONTROL DEVICE ID | ALLOWABLE TRANSMISSION DATA QUANTITY [kbps] | ACTUAL DATA RECEIVE QUANTITY [kbps] |
|---|---|---|---|
| 1 | TC1 | 1,000 | 700 |
| 2 | TC2 | 200 | 150 |
| 3 | TC3 | 300 | 200 |
| : | : | : | : |
| : | : | : | : |
| total | — | 70,000 | 50,000 |

FIG. 9

```
<requestToTransfer>
 <sourceRegionID>TC1</sourceRegionID>
 <sourceDeviceID>Camera101</sourceDeviceID>
 <dataTranmissionRate unit="kbps">200</dataTransmissionRate>
 <dataImportance>100</dataImportance>
 <timeToTerminate>2008-09-20-12-00-00</timeToTerminate>
</requestToTransfer>
``` ic # DATA ACQUISITION SYSTEM AND TRANSMISSION CONTROL DEVICE

CLAIM OF PRIORITY

The present application claims priority from Japanese patent application JP 2009-025047 filed on Feb. 5, 2009, the content of which is hereby incorporated by reference into this application.

FIELD OF THE INVENTION

The present invention relates to a data acquisition system for accumulating plural types of data generated at plural data generating points dispersed over a wide range via a network into one data utilization point.

BACKGROUND OF THE INVENTION

The present invention assumes a system for accumulating data via the Internet at data generating points dispersed over a wide area, into one data utilization point. One such application system for example is a remote video surveillance system in which cameras installed at plural surveillance points dispersed over a wide area normally capture images for a specified time or 24 hours a day, 365 days a year and by centralized monitoring of those captured images in a (monitoring) center can watch for abnormal situations or objects. These types of video surveillance systems can also in many cases accumulate video data captured by normal camera operation for viewing of that video data later on.

When the system here includes several thousand or even tens of thousands of cameras that are centrally monitored at one center, the problem occurs that simultaneously transmitting the video captured by all cameras to the center is practically impossible to accomplish due to the vast amount of data that must be sent. Moreover, even assuming that the vast amount of video data was sent, other problems immediately arise such as whether there is sufficient memory capacity available for all data that was accumulated or whether the processing load posed by that accumulated video data is excessive.

One extremely practical and effective measure for dealing with these problems is to not transmit all of the captured video. During actual use, the value or importance (priority) level of the camera image varies according to the camera or the image capture time. The value of images captured while an object is moving or images of people for example can be called high importance level images. Conversely, images that show nothing or show no change in an object can be called extremely low importance level images. Moreover, if cameras are installed in specified locations to capture images for example wanted by monitoring personnel, then those images are high importance level camera images. The importance level of the images therefore varies in this way so that just video data having value can be efficiently collected by giving priority to sending of video data with a high importance level and by limiting as much as possible the sending of video data having a low importance level. A further result is that the storage capacity required for accumulating data can be conserved and the load from processing the accumulated video data can be alleviated. This approach is common to accumulating all types of data and not just video data. In view of these circumstances, the non-patent document "Study of Transmission Control Methods for Large Scale Surveillance Systems, The Institute of Electrical Engineers of Japan, CMN-08-14, 2008/5" by the present inventors and others, discloses a video network system and transmission control device for controlling the priority of video data transmissions between plural cameras connected to the same transmission control device, by changing the transmit timing of video data on each connected camera, or the transmission quantity (fps: frames per second) per time unit based on the importance level that the transmission control device installed between the cameras and network attached to the video image, that was calculated using image processing and external sensors.

SUMMARY OF THE INVENTION

The non-patent document indicated above discloses technology for priority control of cameras at a surveillance (data generating) point at which cameras are connected to one transmission control device. However that technology does not provide priority control of plural surveillance points within the entire system.

Moreover, this technology is designed to handle data transmission quantities sent from one surveillance (data generating) point as an average value, and as a worst case maximum value. However, when designed to handle a transmission data quantity that is a maximum value assumed for worst cases, the problem arises that utilization efficiency of resources during normal operation is extremely bad and costs are high.

Moreover when designed to send an average data transmission quantity in order to boost resource utilization efficiency the following problems arise. During data transmission for example of data from a data generation point where the data priority or importance level has become extremely high, the receive side cannot cope with the excessive processing loads posed by the data receive processing, image accumulation processing, forming of retrieval indexing and storage processing; and cannot handle such tasks even if the transmit side has ample capacity in terms of transmission performance and bandwidth during the ongoing transmission and wants to drastically increase the transmission data quantity. The receive side likewise cannot handle cases where the maximum processing load was exceeded even if the priority or importance level of the many surveillance (data generating) points was raised at the same time. These types of circumstances are especially likely to occur on wide-band surveillance systems including many surveillance points.

Installing load dispersion equipment at receive-side points or hubs serving as data utilization points was considered as a countermeasure to the above problems; however expansion of the overall system scale required augmenting the equipment on the receive-side points presenting the problem of a limit in terms of scalability.

In view of the above problems, this invention has the object of providing a data acquisition system for acquiring data into data utilization points from plural data generating points by efficient and effective usage of limited overall system resources.

In order to resolve the aforementioned problems, this invention provides a data acquisition system for acquiring data from data generator devices in plural respective data generating points over a network into a single data utilization points serving as a data utilization device, and includes: at least one transmit-side transmission control device at each network data generating point for sending data generated by the data generator device to the data utilization point, and at least one receive-side transmission control device at each network data utilization point for aggregating and sending the incoming transferred data for data utilization; and in which the transmit-side transmission control device receives notification of the allowable data transmission quantity from a receive-side transmission control device and retains that allowable data transmission quantity, and adjusts the transmit data quantity received from the data generator device so as to fit within that allowable data transmission quantity range, and/or receives an allowable transmission data quantity change request from an optional device when a request is made to change the transmission data quantity, and notifies the receive-side transmission control device of that allowable data transmission quantity change request, and the receive-side transmission control device retains the respective allowable data transmission quantities for the plural transmit-side transmission control devices and/or receives each allowable transmission data quantity change request from a portion or all of the plural transmit-side transmission control devices, or from other optional devices and, reassigns the allowable data transmission quantities for all transmit-side transmission control devices to fit within the data processing load range stored beforehand within the data utilization point when an allowable transmission data quantity change request was made and, notifies the corresponding transmit-side transmission control device of those reassigned allowable data transmission quantities.

The present invention is a data acquisition system for acquiring data from plural respective data generating points into data utilization points, and capable of efficiently and effectively acquiring data from limited equipment resources in the overall system for sending, acquiring, and utilizing data. More specifically, this invention is capable of reliably sending or acquiring data with a high importance level in the overall system by order of priority.

The present invention is further capable of effective use of storage devices more efficiently because only data with a high order of importance is selected when accumulating the acquired data into storage devices.

BRIEF DESCRIPTION OF THE DRAWINGS

FIGS. 7A and 7B are drawings showing an example of the transmission request control table for the receive-side transmission control device of the first embodiment;
FIG. 8 is a drawing showing an example of the allowable data transmission quantity control table for the receive-side transmission control device of the first embodiment;
FIG. 9 is a drawing showing an example of the data processing request message format of the first embodiment.

DETAILED DESCRIPTION OF THE PREFERRED EMBODIMENTS

The various embodiments of the present invention are described next based on the accompanying drawings. In the following description, be aware that the allowable data transmission quantity which is the amount of data allowable for transfer or transmission is sometimes called the "allowable data transmission quantity" here.

First Embodiment

Figure 1:
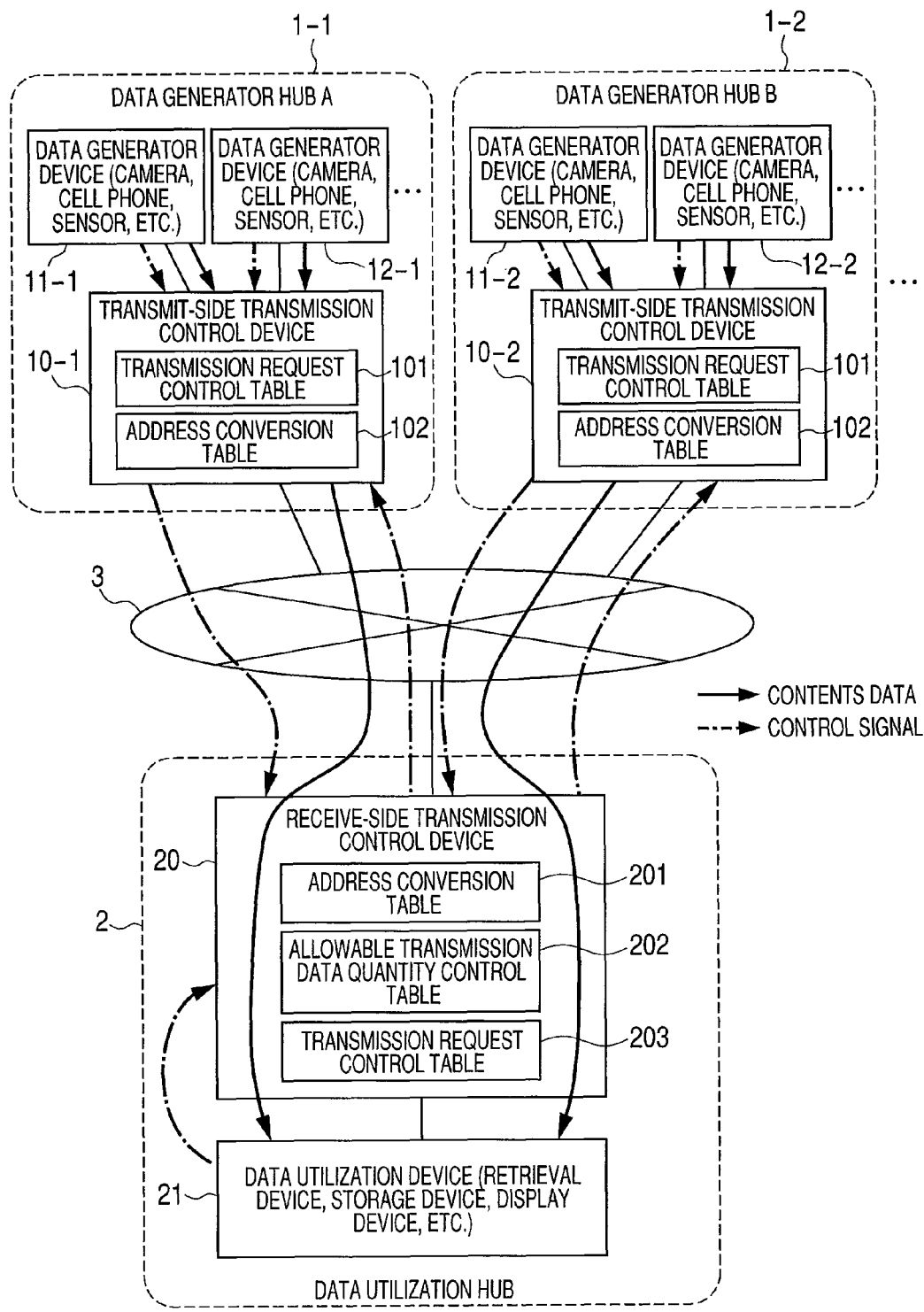
FIG. 1 is a drawing showing a structure of the data acquisition system of the first embodiment.

FIG. 1 is a drawing showing an example of the structure of data acquisition system of the first embodiment. The system includes plural data generating points 1-1, 1-2, . . . as well as one data utilization point 2 enclosing the network 3. The data acquisition system is a system designed to efficiently and effectively transmit the various types of data generated by the plural data generator devices 11-X, 12-X, . . . in each of the data generating points 1-X by way of the network 3 to the data utilization device 21 within the data utilization point 2. Transmission control devices are installed at the contact point on the network 3 between the data generator device and the data utilization device. A transmit-side transmission control device 10-X is installed on the data generator point side; and a receive-side transmission control device 20 is installed on the data utilization point side. FIG. 1 respectively shows by way of a solid line and a dot-dash line the content data and the control signals transferred between each device.

Here, the data generator devices 11-X, 12-X, . . . are camera devices or portable terminals such as camera devices or sensors or portable terminals f various types such as cellular telephones, or calculating devices such as personal computers (hereafter PC), or may be combinations of these devices. If the data generator devices include cameras or portable terminals or cellular telephones containing cameras then these devices may perform some form of image processing such as object identification or motion detection capture on the captured image. The data utilization device 21 may for example include data accumulation devices, data retrieval devices, and data display devices, etc.

Specific examples of applications of the system structure in FIG. 1 may include large-scale monitor (or surveillance) systems in which numerous cameras serving as data generator devices are dispersed locations connected by a network, and transfer the acquired images over the network to a monitor (surveillance) center serving as the data utilization point, and besides centralized monitoring on video display devices, the monitor center simultaneously accumulated video in a video accumulation device, and also retrieves the accumulated video (or images) via a video retrieval device.

The transmit-side transmission control device 10-X relays the data sent from the data generator devices 11-X, 12-X within the data generator point, and at that time adjusts the data quantity transferred to the data utilization point according to the situation, based on the transmission request control table 101. If sending for example a standard 30 [frames per second] images, then two frames among every three frames are discarded and only one frame sent, in order to send a transmission reduced to 10 [fps] images.

The receive-side transmission control device 20 transfers the data received via the network 3 to the data utilization device 21, and simultaneously arbitrates among the plural transmit-side transmission control devices 10-X, adjusting the incoming data quantity transferred via the applicable transmit-side transmission control device 10-X on the overall system. Related data utilized as reference data for that arbitration process is retained respectively in the allowable transmission data quantity control table 202 (described later on in detail in FIG. 6) that holds the allowable data transmit capacity permitted for data acquired from each transmit-side transmission control device; and in the transmission request control table 203 (described later on in detail in FIG. 7) for holding the transmit requests for each data generator device (each camera) received from an optional device or the transmit request for each data generator point, namely transmit-side transmission control devices The transmit-side transmission control device 10-X and the receive-side transmission control device 20 each contain an address conversion table 102 and 201. These address conversion tables are used to simplify the system operation. The address of control signals sent from the data utilization device 21 to an optional data generator device for example are converted to allow sending them by way of the transmit-side control device connected to that data generator device.

Needless to say, the transmit-side transmission control device 10-X and the receive-side transmission control device 20 may consist of a computer connectable to a network such as a general-purpose computer (PC) or a server device, etc. The devices 10-X and 20 in other words include a central processing unit (CPU) to perform control processing tasks and, a memory serving as the storage unit, and an input/output unit and transmit/receive unit as the network interface, etc. These devices 10-X and 20 execute the above described functions by running programs that were pre-stored in the memory or stored after being downloaded from a network. The various types of tables are also stored in the memory.

The method for arbitrating the overall system transmission quantity run by the processing units in the above described receive-side transmission control device 20 is described next utilizing the flowcharts in FIGS. 3 to 5, and the sequence chart in FIG. 2.

Figure 2:
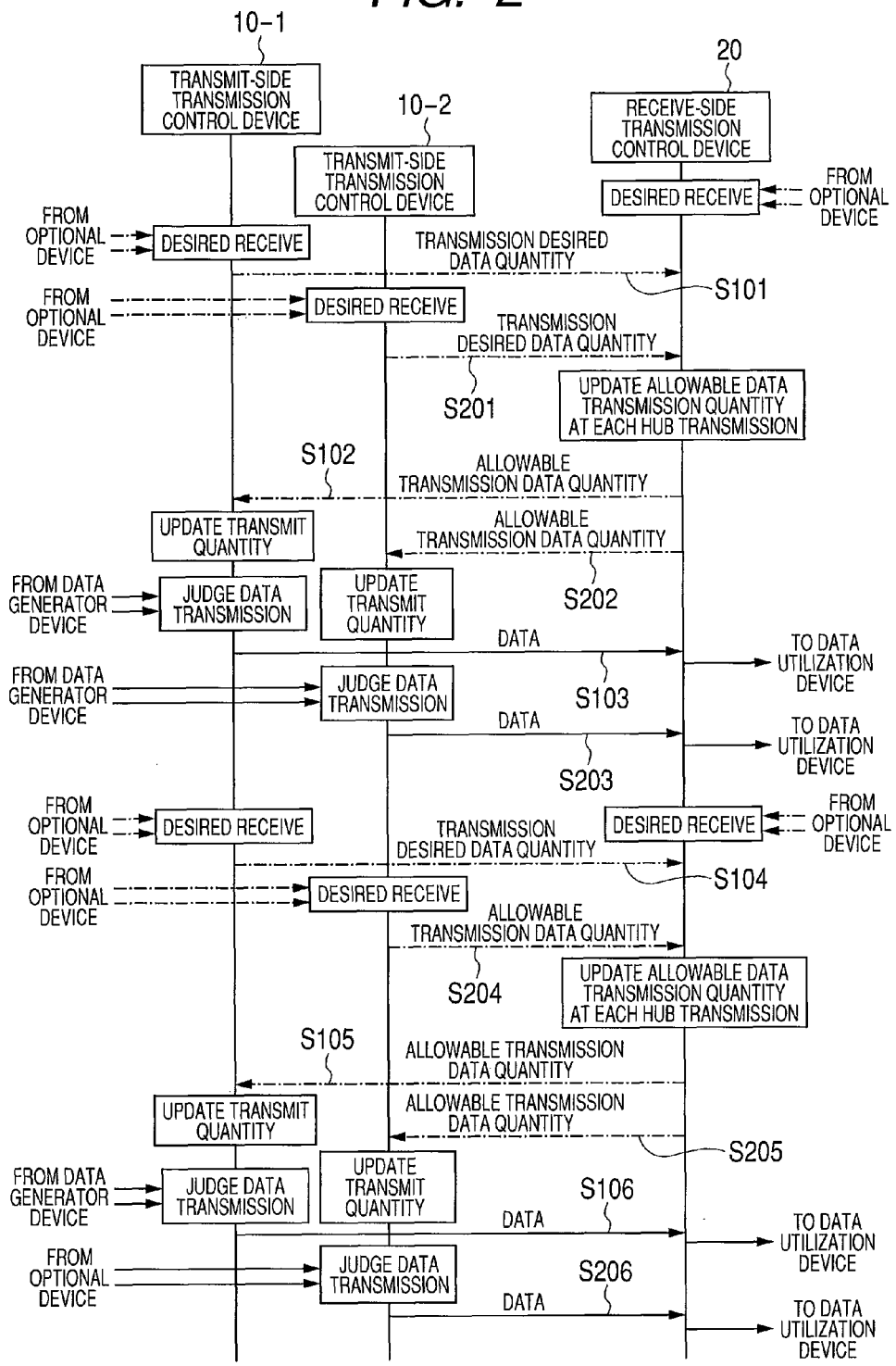
FIG. 2 is a sequence diagram of the flow between the transmission control devices of the first embodiment.
Figure 3:
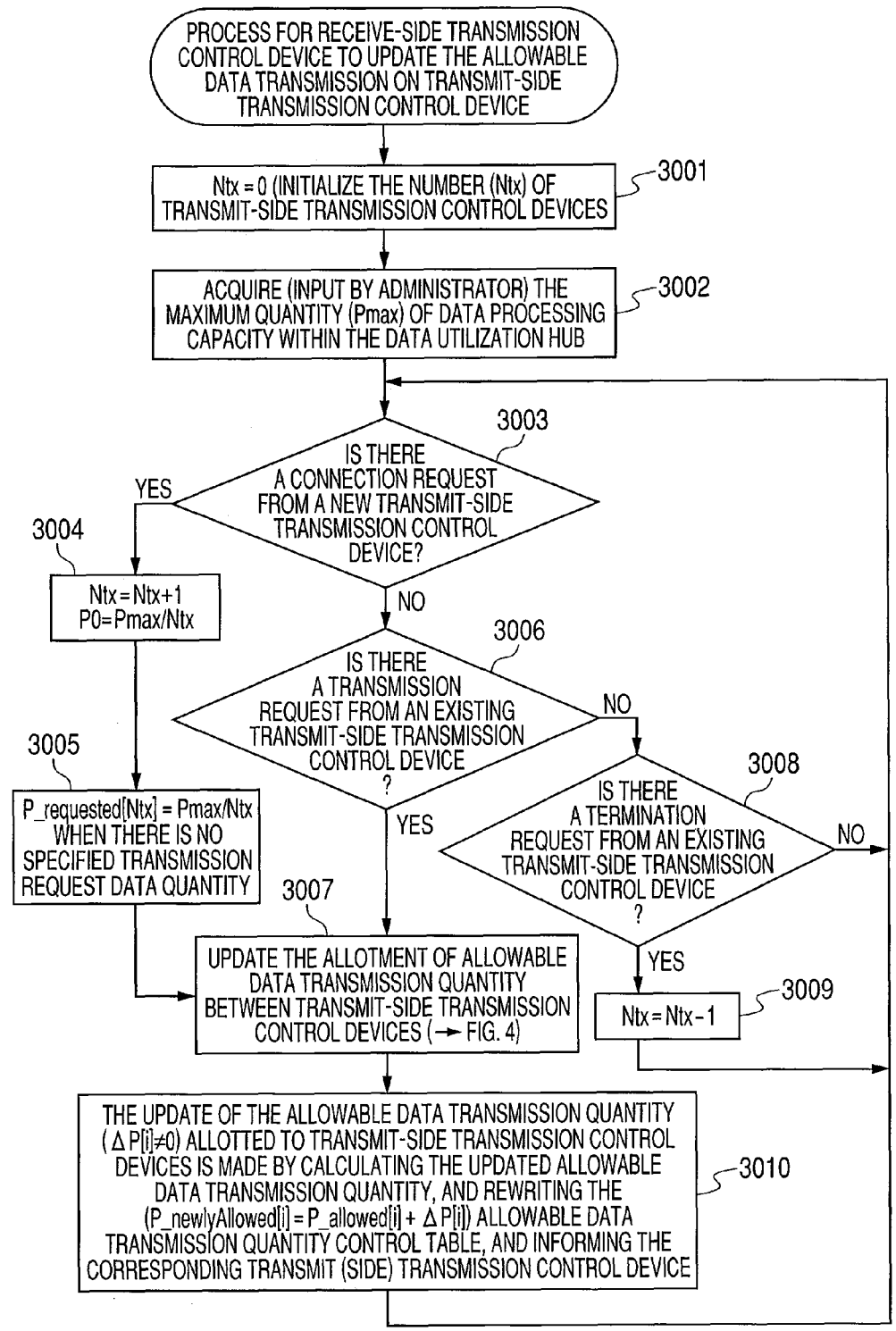
FIG. 3 is a flow chart showing the operation in the receive-side transmission control device of the first embodiment.

FIG. 2 is a sequence diagram for describing the exchange of acquisition data and control messages between one receive-side transmission control device 20, and the two transmit-side transmission control devices 10-1 and 10-2 to efficiently and effectively arbitrate the transmission quantity in the overall system, in the data acquisition system of this embodiment.

The receive-side transmission control device 20 retains and manages the "allowable data transmission quantity" for each of the plural data generating points or in other words each of the transmit-side transmission control devices 10 in the allowable transmission data quantity control table 202 of a memory unit. The system administrator for example can enter in advance an "allowable data transmission quantity" default value that is a data quantity capable of being processed in a certain number of time units based on the processing capacity at the data utilization point. That default value may be a value divided equally to match the number of data utilization points (described in detail later on in FIG. 3). Moreover, this "allowable data transmission quantity" may be set within the receive-side transmission control device and rewritten at any time whenever there is a request or a need (hereafter called "need" or "as needed") from an optional device (described in detail later on in FIG. 4 and FIG. 5).

Each of the transmit-side transmission control devices 10-1, 10-2 and the receive-side transmission control device 20 receives a "need" message containing the "required data transmission quantity" as shown in FIG. 2. Each transmit-side transmission control device 10-1, 10-2 that received the need or request notifies the receive-side transmission control device 20 of the "required data transmission quantity" that was received (S101, S201, S104, S204). These "required" notifications of course need only be made when necessary by the required device within the overall system, and normally the need requests are issued at an optional timing from some single device due to some type of reason. Though not adequately shown in FIG. 2, the "allowable data transmission quantity" may therefore be rewritten at any time, triggered by a need/request from an optional device.

The receive-side transmission control device 20 retains the "allowable data transmission quantity" it received, in the transmission request control table 203 in the memory unit, and rewrites the corresponding "required data transmission quantity". The receive-side transmission control device 20 next assigns a new "allowable data transmission quantity" to each transmit-side transmission control device 10-X and rewrites the allowable transmission data quantity control table 202 based on the "allowable transmission data quantity" value held in the transmission request control table 203 and the "allowable transmission data quantity" value held in the allowable transmission data quantity control table 202, and notifies the respective transmit-side transmission control devices 10-1, 10-2 of the rewritten "allowable transmission data quantity" (S102, S202, S105, S205). Transmit-side transmission control devices whose "allowable transmission data quantity" was not rewritten need not be notified at this time.

The transmit-side transmission control devices 10-1, 10-2 retains the "allowable data transmission quantity" received via the above described notification, in the memory unit as the "allowable data transmission quantity", and based on this value arbitrates (data transmit decision) whether or not to transfer the incoming data sent from the data generator device to the data utilization point (receive-side transmission control device). More specifically the data may be thinned. If the data is image data, then the image data may be changed by periodically discarding, or stopping the discarding of data in frame units to consequently change the image frame rate, or roughen the image resolution (size, gray level), or return to the original setting. The adjustment results and valid data are then sent to the receive-side transmission control device (S103, S203, S106, S206).

The control procedure for rewriting the "allowable transmission data quantity" is described next in FIG. 3. Here, FIG. 3 is a flowchart showing an example of the rewrite control procedure in which the receive-side transmission control device 20 rewrites or renews the "allowable transmission data quantity" in each of the data generating points 1-X, or in other words in each of the transmit-side control devices 11-X, 12-X, etc. First of all, the variable Ntx for calculating the number of transmit-side transmission control devices is reset (initialized) to zero (3001), and the maximum value Pmax [bits per second, bps] showing the data quantity that can be processed based on the processing capacity within the data utilization point is acquired (3002). Here the Pmax value is assumed to be entered by the system operator. The processing is next branched according to: a connection request from the new transmit-side transmission control device (3003), a transmit request from the pre-existing transmit-side transmission control device (3006); and a cutoff request from the pre-existing transmit-side transmission control device (3008).

The receive-side transmission control device 20 rewrites the Ntx (equivalent to the number of transmit-side transmission control devices at this point in time) by incrementing the Ntx count upwards each time a connection request is received from the new transmit-side transmission control device. A reference value (average value) P0 may also be found for the "allowable data transmission quantity" by dividing the Pmax value by the Ntx value. The control device 20 next rewrites and allocates the "allowable transmission data quantity" contained in the connection request for the entire system or in other words rewrites and allocates the "allowable transmission data quantity" among the transmit-side transmission control devices (3007). If the connection request does not include an "allowable transmission data quantity," then the previously found P0 may be set as the "allowable transmission data quantity".

If a transmit request was received from a pre-existing transmit-side transmission control device then the "allowable transmission data quantity" contained in that transmit request is used, and the "allowable transmission data quantity" rewrite is allocated among the transmit-side transmission control devices (3007).

If a cutoff request was received from a pre-existing transmit-side transmission control device, then the control device 20 decrements (counts down) the Ntx value (3009).

If the "allowable transmission data quantity" rewrite allocation process (3007) was executed then those results are reflected in the allowable data transmission quantity control table 202 and the newly written "allowable transmission data quantity" is notified to each applicable transmit-side transmission control device. More specifically, the amount of change $\Delta P[i]$ for the allowable transmission is calculated as a result of the "allowable transmission data quantity" rewrite process allocation so that if that amount of change $\Delta P[i]$ is other than 0 then the new "allowable transmission data quantity" P_newlyAllowed[i] is found by adding the value (P_Allowed [i]+$\Delta P[i]$) to the amount of change in the "allowable transmission data quantity", rewriting that new value into the table, and notifying the corresponding transmit-side transmission control device of that value. To keep the system operation stable, the transmit-side transmission control device that is object of the transmit request is preferably notified after all other transmit-side transmission control devices have been notified.

The transmit-side transmission control device that was notified, then adjusts the transmit processing based on the received values.

An example of the "allowable transmission data quantity" rewrite allocation procedure when a transmit request is received is described next while referring to FIG. 4 and FIG. 5.

Figure 4:
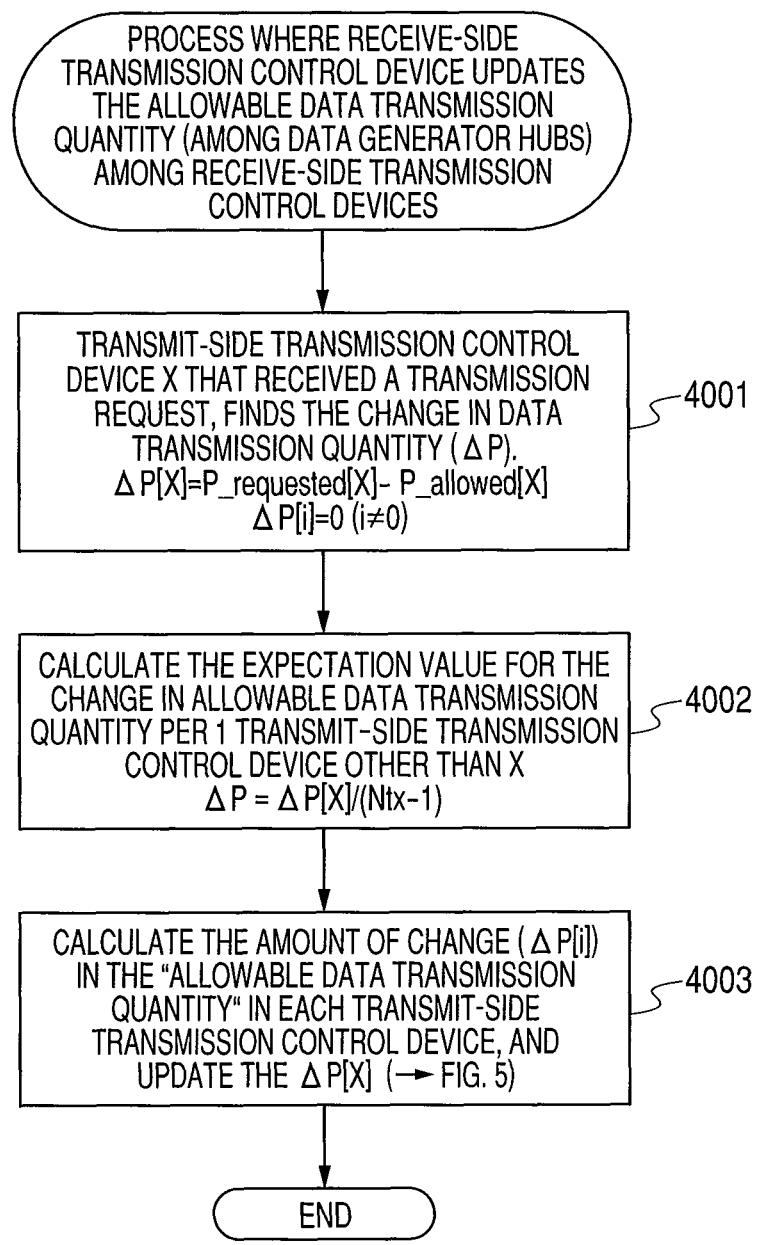
FIG. 4 is a flow chart showing the operation in the receive-side transmission control device of the first embodiment.

FIG. 4 is a flow chart showing the "allowable transmission data quantity" rewrite allocation procedure that is triggered by notification when the processing unit in the receive-side transmission control device 20 receives a transmit request notification from an optional device including transmit-side transmission control devices. The processing unit in the device 20 first of all receives a transmit request. That transmit request contains a transmit-side transmission control device as the transmit source (set as X); and a data quantity (P_requested[X]) per time unit that must be subsequently sent from X. The difference between the P_requested[X] value, and the "allowable transmission data quantity" (P_allowed[X]) for the transmit-side transmission control device at that time is calculated as the transmit data change amount ($\Delta P[X]$) (4001). This value is normally considered a positive or plus value (when wishing to increase the transmit quantity because the level of importance is higher) however a negative or minus value may also be used. The transmit request may even directly contain the transmit data change amount ($\Delta P[X]$). The transmit data change amount is reset to the zero in transmit-side transmission control devices other than X, simultaneous with calculation of the X transmit data change amount (4001).

The processing unit in device 20 then adjusts the allowable transmission data capacity allocated to the transmit-side transmission control devices so that the overall system can as much as possible absorb the X transmit data change amount ($\Delta P[X]$) within the entire system maximum processing quantity (Pmax). The device 20 processing unit first of all finds a value that is the change amount ($\Delta P$) divided by the number of remaining transmit-side transmission control devices, as a value ($\Delta p$) that should be absorbed per each of the single remaining transmit-side transmission control devices, assuming that the X transmit data change amount ($\Delta P[X]$) is evenly distributed among the other transmit-side transmission control devices (4002). The processing unit next calculates an allowable transmit data change amount ($\Delta P[i]$) for each transmit-side transmission control device when the change pass/fail decision for the "allowable transmission data quantity" of each transmit-side transmission control device and the "allowable transmission data quantity" can be changed (4003).

Figure 5:
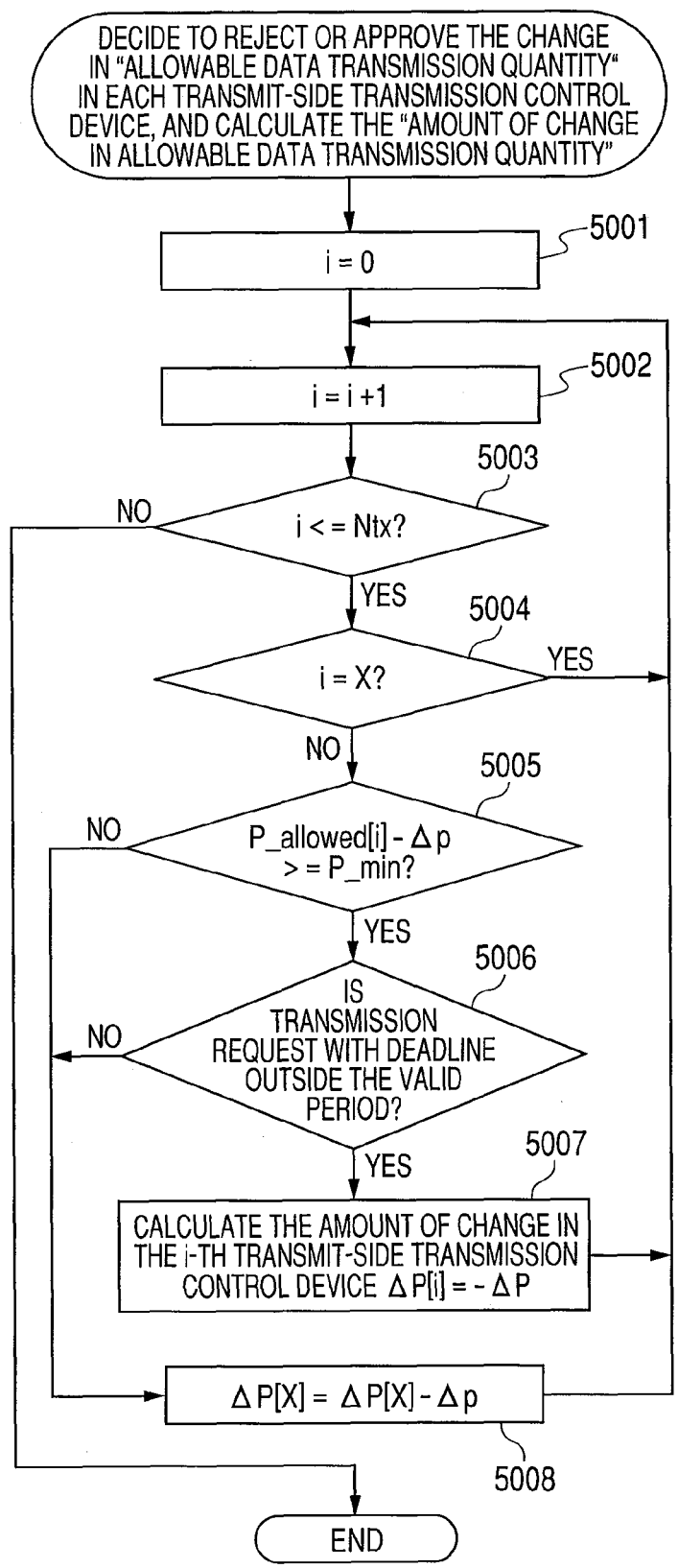
FIG. 5 is a flow chart showing the operation in the receive-side transmission control device of the first embodiment.

FIG. 5 is a flow chart showing in more detail the: procedure (4003) for making the change pass/fail decision for the "allowable transmission data quantity" of each transmit-side transmission control device, and for calculating the "allowable transmission data quantity" when changeable. The processing unit first of all resets the variable i functioning as a counter (5001), starts the variable i count up (5002), and finds the number of the transmit-side transmission control device for the change pass/fail decision (5003, 5004). The pass-fail decision is a two-stage verification. In the first-stage verification, a check is made whether or not the allowable transmit data fell below a lower threshold (P_min), when $\Delta p$ was subtracted from the current "allowable transmission data quantity" (P_allowed[i]) of the transmit-side transmission control device having the applicable i number (5005). If the allowable transmit quantity is not below the lower threshold, then the check proceeds to the second-stage verification. Here, a search is made for P_allowed[i] in the allowable transmission data quantity control table 202 held in the memory unit (described later in FIG. 6), and the P_min set beforehand by the system administrator is retained in the memory unit. This two-stage verification confirms whether the transmit request is accompanied by a deadline (5006). When there is a deadline-dated transmit request and the time is still within the deadline, then changing the allowable transmission data quantity is judged impossible in order to avoid adverse effects from that transmit request, and changes to all other requests are allowed. More specifically, the processing unit checks the transmission request control table 203 held in the memory unit. If the request passed the above two-stage verification, then the allowable transmit data change amount is changed to $-\Delta p$ for the applicable transmit-side transmission control device (5007). If the request did not pass any portion of the two-stage verification, then the allowable transmit data change amount for X is reduced by $\Delta p$ (5008). The above verifications and calculations are repeated according to the number of already connected transmit-side transmission control devices.

Figure 6:
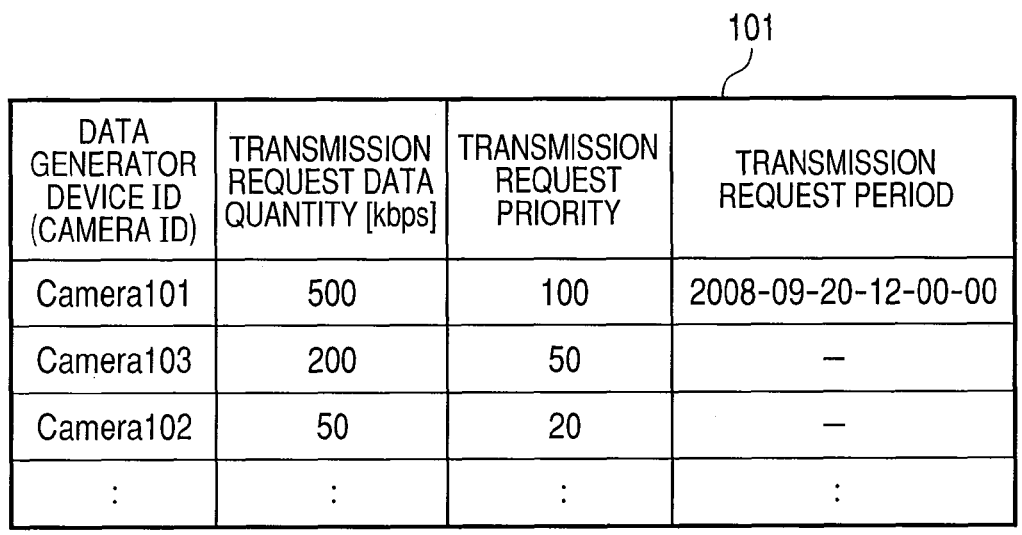
FIG. 6 is a drawing showing an example of the transmission request control table for the transmit-side transmission control device of the first embodiment.

FIG. 6 shows an example of the transmission request control table 101 for the transmit-side transmission control device 10. FIG. 7 shows an example of the transmission request control table 203 for the receive-side transmission control device 20. As shown in FIG. 2, when the system receives a transmit request, the transmit-side transmission control device 10 and receive-side transmission control device 20 jointly share information according to the appropriate protocols. A basic element of the transmit request includes and ID (a camera ID in FIG. 6 and FIG. 7) for the data generator device, a transmit request amount, a transmit request level of importance, and a transmit request deadline. The receive-side transmission control device 20 shown in FIG. 7 contains a transmit-side transmission control device ID needed for system management. The transmit request data quantity is given in units for example of bps (bits per second). The transmit request level of importance is set for example as a value from 0 to 100. The transmit request deadline is expressed for example in years-months-days-minutes-seconds.

The transmission request control table 203 retained in the memory unit within the receive-side transmission control device as shown in FIG. 7, holds a list of (a) data generator devices and a list of (b) transmit-side transmission control devices.

FIG. 8 shows an example of the allowable transmission data quantity control table 202 retained within the receive-side transmission control device. The processing unit finds the "allowable transmission data quantity" for each transmit-side transmission control device as already described based on the transmission request control table 203 shown in FIG. 7, according to the flow charts in FIG. 4 and FIG. 5. To mainly achieve overall system control, the actual measured values may also be managed within the same table by utilizing a monitor means for monitoring the data quantity received on each transmit-side transmission control device as shown for example in FIG. 8. The receive data quantity monitor is capable of periodically recording and calculating data quantities at certain time units during the data transfer process.

FIG. 9 shows an example of a transmit request message. In this example, the identifier (sourceRegionID) for the data transmit transmission control device at the data generating point is shown as "TC1"; the identifier (sourceDeviceID) for the data generator device is "Camera101"; the data transmissionRate) is 200 [kbps]"; the importance level (dataImportance) is "100"; and the deadline for request (timeToTerminate) is "2008 year, September month, 20 day, 12 o'clock, 00 minutes, 00 seconds". Some sections such as the dataImportance and timeToTerminate may be omitted. Moreover, the sourceRegionID may also be omitted if the system structural management information is retained in another application.

Second Embodiment

The second embodiment of this invention relates to a specific remote surveillance system assumed to include not only cameras but also sensors and is described next using FIG. 10 through FIG. 12. In the description for this embodiment, structural elements in common with FIG. 1 are assigned the same part numbers as the drawings in the first embodiment.

Figure 10:
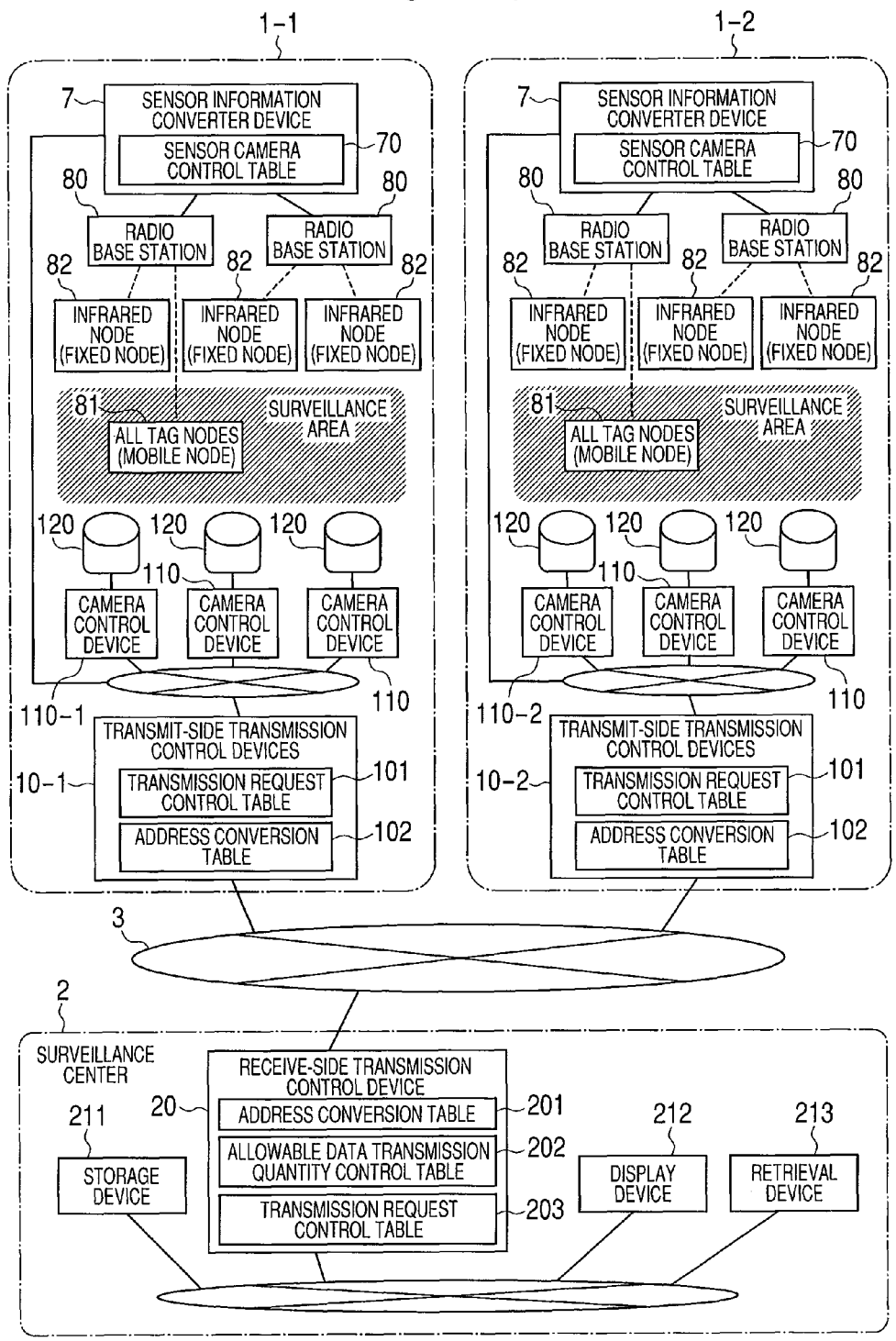
FIG. 10 is a drawing showing a structure of the data acquisition system of the second embodiment.

FIG. 10 is a block diagram showing the structure of the system. The system block diagram in FIG. 10 is a more specific example than in FIG. 1, in which plural data generating points 1-1, 1-2 and data utilization points are connected over a network 3. The data generating points are not limited to two locations. FIG. 10 includes an applicable camera 120, and a camera control device 110 connected to the camera 120, as the data generator device 11-X in FIG. 1; and contains the storage device 211, the display device 212, and the retrieval device 213 as the data utilization device 21 in FIG. 1. Also, sensor nodes such as all tag nodes (mobile nodes) 81 and infrared nodes 82 within the data generating points 1-1, 1-2 are utilized as information for setting the importance level for images from the cameras as described later on. Needless to say however, these sensor nodes themselves may be utilized as data generator devices.

The camera 120 is assumed to be a commercially supplied camera available in various types and capable of acquiring still images and motion images. The camera control device 110 is assumed to be a general-purpose PC or a built-in PC. The camera 120 and the camera control device 110 may be connected by an Ethernet (commercial trademark) twisted pair cable, IEEE1394 cable or USB cable, etc. Any cable however may be utilized as long as the required transmission bandwidth is available. The camera control device 110 makes a request to the camera 120 for images, and the camera 120 then receives image data output in response to that request, and sends that image data to the transmit-side transmission control device 10-X. When the request from the camera control device 110 is received, the camera 120 sends the still image or motion image data. The camera 120 or the camera control device 110 may also contain image processing functions. The image processing may for example be implemented by techniques of the known art such as detection processing to find moving objects and the size (area width) occupied by the object in the image, people detection, and facial detection processes, etc. In the present embodiment, information on the importance level of images from the camera is set as values from 0 to 100 according to these image processing results. This importance level information for example may be defined by a suitable formula to fall within 0 to 100 based on the detection score from moving objects and score for facial detection. Needless to say, this type of processing may be executed on a program in the processing unit of the above described general-purpose PC or built-in PC.

Sensor information from the sensor nodes may be utilized as information for setting the importance level. The subsystems in FIG. 10 are made up of the all tag nodes 81, the infrared nodes 82, the radio base stations 80, and the sensor information converter devices 7. These all tag nodes 81 may be called mobile nodes because of their movement capability through being carried by a person or being attached to an object capable of movement.

The dashed (broken) line in FIG. 10, joining the radio base station 80, and the all tag nodes 81 or infrared nodes 82 functioning as the sensor node, indicates the wireless communication path. The all tag node 81 is a compact mobile terminal containing at least a power supply and microcomputer, a wireless communication function and an infrared communication function. The all tag mode also contains a pre-assigned ID. The infrared node 82 is a compact, fixed terminal (fixed node) containing at least a power supply and microcomputer and infrared communication function. The infrared node 82 also of course contains a pre-assigned ID. The infrared node 82 may also be provided with a wireless communication function. The all tag node 81 and infrared node 82 are capable of mutually exchanging ID by infrared communication when at distances within two meters. When an ID is received, the all tag node 81 and infrared node 82 send it along with their own ID by way of the radio station 80 to the sensor information converter device 7.

The sensor information converter device 7 is capable of automatically generating information signifying what all tag node is in the vicinity of what infrared node. In other words, by essentially making a floor map in advance for position information on where the infrared nodes are stationed, a function giving nearly real-time knowledge of positional information on people carrying the all tag node, or items on which the all tag node is attached according to the position accuracy for the location where the infrared node is installed. The sensor for measuring the position is not limited to infrared and may be a method of the known art using radio waves or sound waves.

Here we assume the infrared node 82 of the above example is fixed near the camera 120, and the infrared node 82 and camera 120 pair are installed near the sensor camera control table 70 of sensor information converter device 7. When there is a high probability that the all tag node 81 will enter within the visual range of camera 120, the sensor information converter device 7 is able to judge that situation and consequently can output that result as the all tag node 81 detection information.

Detection information on the all tag node 82 output by the sensor information converter device 7 can also be added as the importance level information in the transmit-side transmission control device 10-X based on the above image processing. If the importance level has become higher then a transmission request for increasing the allowable transmission data quantity can be sent to the receive-side transmission control device 20. Conversely, if the importance level has become lower then a transmission request for decreasing the allowable transmission data quantity can be sent to the receive-side transmission control device 20.

The storage device 211 is a device for accumulating image data and sensor data sent from the data generating points 1-1, 1-2. The hardware may consist of a general-purpose PC or server device, and equipment with suitable functions may be required according to the operation scale. On the sending an image request the storage device 211 may receive and accumulate images as that reply, or may receive and accumulate images regardless of whether or not there is a request.

The display device 212 is a device for displaying the target surveillance images to the monitor (or surveillance) operator, and at the same time also serves as a user interface operated by the monitor operator. This device (212) may for example display certain specified images preset by the monitor operator or give priority to display of images requested by the surveillance operator. This device (212) may also display in real-time the latest images targeted for surveillance, or may display past images accumulated in the storage device 211. The device (212) may also give priority to display of images having a high importance level.

The retrieval device 213 retrieves images accumulated in the storage device 211 based on the requests from the monitor operator that the system received via the display device 212, and for example retains an index for high-speed retrieval.

Figure 11:
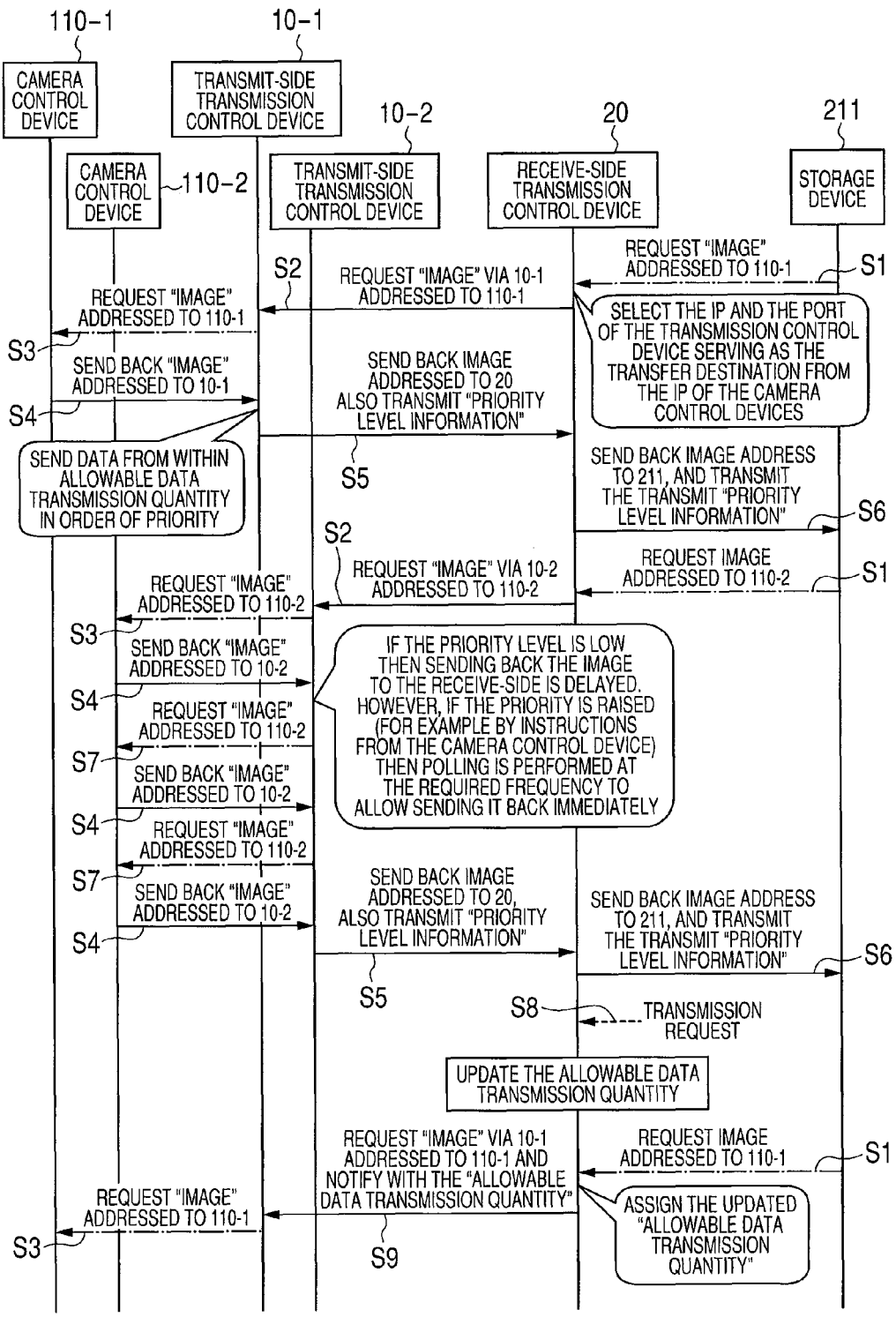
FIG. 11 is a drawing showing an example of the sequence of the second embodiment.
Figure 12:
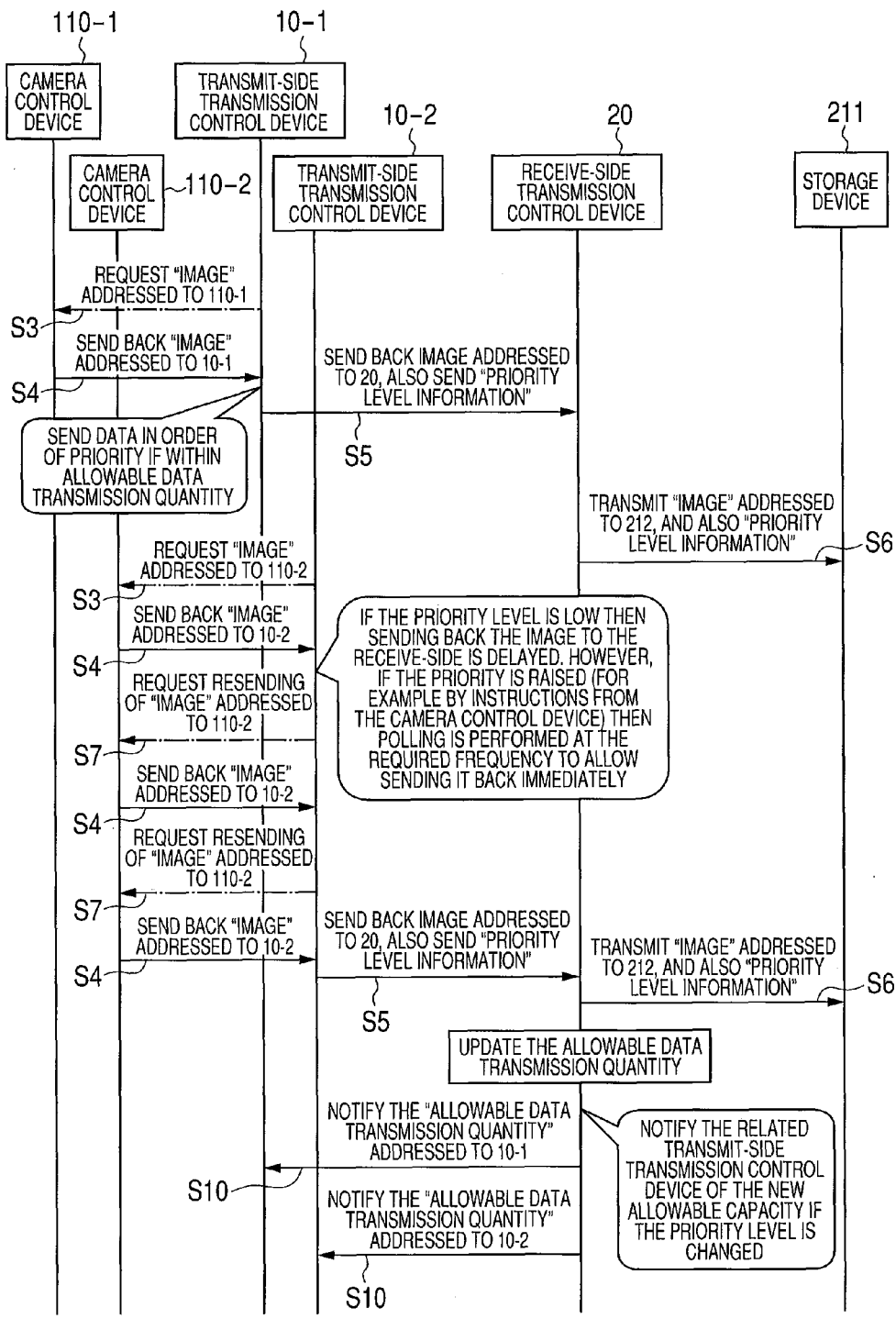
FIG. 12 is a drawing showing an example of the sequence of the second embodiment.

FIG. 11 and FIG. 12 show examples of normal operation of the system in FIG. 10. The difference between FIG. 11 and FIG. 12 is that different devices are used for main control of the image data transmission. FIG. 11 shows the operation sequence mainly controlled by the storage device 211, and FIG. 12 shows the operation sequence mainly controlled by the transmit-side transmission control device. Besides the above devices, main control may be performed by the camera control device 110 or camera 120, or the receive-side transmission control device.

FIG. 11 shows the operation sequence during image data transmission (accumulation) mainly controlled by the storage device 211. The solid line arrow in FIG. 11 expresses transmission of the data signal, and the dot-dash line arrow expresses transmission of the control signal.

In this sequence, the storage device 211 first of all sends an image request control signal (S1) that functions as a trigger for accumulating the image data, to the camera control device 110-X. The receive-side transmission control device 20 relays this signal, determines the corresponding transmit-side transmission control device and sends the signal there (S2, S9). The receive-side transmission control device 20 transfers only the image request at this time after finding the transmission destination, if the "allowable transmission data quantity" for the transmit-side transmission control device has not been updated (rewritten) (S2). However, if the "allowable transmission data quantity" was rewritten, then that "allowable transmission data quantity" is attached to the image request control signal, and sent to the transmit-side transmission control device 10-X that is the transfer destination (S9).

The transmit-side transmission control device 10-X that received that image request (S2, S9), transfers that image request control signal to the camera control device 110-X (S3). The "allowable transmission data quantity" contained in S9 does not need to be transferred to the camera control device and therefore may be removed. The camera control device 110-X that received the image request (S3) operates the connected camera 120 (omitted in FIG. 11) and sends back the acquired image data to the transmit-side transmission control device 10-X (S4).

The transmit-side transmission control device 10-X that received the image data, next transfers the image data to the receive-side transmission control device 20 (S5). The transmit-side transmission control device 10-X may here also attach importance level information to the image data. This importance level information more specifically shows the level of importance of image data for the applicable camera, based on image processing and sensor information. This importance level information may be included and sent in the same packet or the same stream as the image data, or may be sent in a separate session.

The transmit-side transmission control device 10-X here adjusts the return timing to the receive-side transmission control device 20 according to the importance level information of each camera. In the example in FIG. 11, the first transmit-side transmission control device 10-1 immediately transfers image data in reply to the receive-side transmission control device 20 and, the second transmit-side transmission control device 10-2 resends a request to the camera control device 110-2 without transferring a second portion of image data to the receive-side transmission control device 20 (S7), and at the third time finally transfers image data in reply to the receive-side transmission control device 20. In other words, the second transmit-side transmission control device 10-2 sends back data at a timing that is delayed compared to the first transmit-side transmission control device 10-1. The second transmit-side transmission control device 10-2 consequently suppresses the amount of data transmitted per unit of time more than does the first transmit-side transmission control device 10-1.

The receive-side transmission control device 20 that received image data via the transmit-side transmission control device 10-X, then transfers the image data and importance level to the storage device 211 which is the original source of the request (S6). The device 20 simultaneously checks whether or not a change has been made in the importance level information, and attempts to rewrite (update) the allowable transmission data quantity of the transmit-side transmission control device if the importance level was rewritten. The device 20 does the same if a transmit request (S8) was conveyed along with the importance level by way of an optional device. If the "allowable transmission data quantity" of a certain transmit-side transmission control device 10-X was rewritten during transfer of an image request then the receive-side transmission control device 20 attaches that information to the image request and sends it to the corresponding transmit-side transmission control device (S9).

Finally, the storage device 211 uses a pre-established procedure to accumulate the received image data and importance level. Though not shown in FIG. 11, the storage device 211 or the receive-side transmission control device transfer image data to the display device 212 at the same time so that the display device 212 continues to display the surveillance object from the surveillance system and render the display effect according to the importance level.

FIG. 12 is a chart showing the operation sequence during image data transmission (acquisition) mainly controlled by the transmit-side transmission control device 10-X. Just as in FIG. 11, the solid line arrow in FIG. 12 expresses transmission of the data signal, and the dot-dash line arrow expresses transmission of the control signal.

Here, the transmit-side transmission control device 10-X first of all sends an image request control signal (S3) that functions as a trigger for acquiring image data to the camera control device 110-X. The following operation sequence for the camera control device 110-X, the transmit-side transmission control device 10-X, and the receive-side transmission control device 20 is the same as in the case described for FIG. 11.

When the receive-side transmission control device 20 detects that the importance level information attached to the image data received via the transmit-side transmission control device 10-X has been rewritten (updated), or when a transmit request received at an optional timing has a rewritten (updated) importance level information, the device 20 attempts rewriting the "allowable transmission data quantity" value on each transmit-side transmission control device 10-X, and notifies the transmit-side transmission control device 10-X whose "allowable transmission data quantity" value was rewritten, of those results (S10).

In the above description for the second embodiment, only one camera device 110-1 or 110-2 was connected to the transmit-side transmission control devices 10-1 or 10-2 in FIG. 10, FIG. 11 and FIG. 12, however two or more camera control devices may be connected.

The present invention may for example be utilized in remote surveillance systems utilizing a structure where data captured by cameras is acquired in a monitor center.

What is claimed is:

1. A data acquisition system for collecting data over a network, from data generator devices at a plurality of respective data generating points, into a data utilization device at a data utilization point, comprising at least:
   a plurality of transmit-side transmission control devices, each including a CPU, on the data generating point side of the network for sending data generated by the data generator devices to the data utilization point side; and
   a receive-side transmission control device, including a CPU, on the data utilization point side for aggregating the data from the plurality of transmit-side transmission control devices, and sending the data to the data utilization device,
   wherein the transmit-side transmission control device
   receives notification of an allowable data transmission quantity from the receive-side transmission control device,
   retains that allowable data transmission quantity,
   adjusts the data quantity sent from the data generator device so as to fit within that allowable data transmission quantity range,
   generates a request to change the allowable transmission data quantity based on a transfer need request from a data generator device among the data generating points, and
   sends the request to change the allowable transmission data quantity to the receive-side transmission control device,
   wherein the receive-side transmission control device
   retains the respective allowable data transmission quantities for the plurality of transmit-side transmission control devices,
   upon receiving the request to change the allowable transmission data quantity, reallocates the allowable data transmission quantities among the transmit-side transmission control devices to fit within the data processing load range within the data utilization point, and
   notifies the corresponding transmit-side transmission control devices of the reallocated allowable data transmission quantities.

2. The data acquisition system according to claim 1, wherein
   the allowable data transmission quantity change request is a request from an optional device within the data utilization point, to change the allowable data transmission quantity of at least one of the plurality of transmit-side transmission control devices.

3. The data acquisition system according to claim 1, wherein
   the allowable data transmission quantity change request is a request received from an optional device within the data generating point, to change the allowable data transmission quantity; and that the transmit-side transmission control device sends to the receive-side transmission control device.

4. The data acquisition system according to claim 1, wherein
   the allowable data transmission quantity change request is a request received from an optional device within the data utilization point, to change the allowable data transmission quantity of at least one of the plurality of transmit-side transmission control devices; or is a request received from an optional device within the data generating point to change the data transmission quantity, and that the transmit-side transmission control device sends to the receive-side transmission control device.

5. The data acquisition system according to claim 1, wherein the transmit-side transmission control device transfers a portion of the data that was transferred from the data generator device and discards a portion so that the data transmission quantity is within the range of the retained allowable data transmission quantity.

6. The data acquisition system according to claim 1,
   wherein the data generator device is a camera device that captures images, and
   wherein the transmit-side transmission control device transfers a portion of the image data that was transferred from the camera device and discards a portion so that the data transmission quantity is within the range of the retained allowable data transmission quantity.

7. The data acquisition system according to claim 1,
   wherein the data generator device is a camera device that captures images, and
   wherein the transmit-side transmission control device converts the resolution of the image data that was transferred from the camera device so that the data transmission quantity is within the range of the retained allowable data transmission quantity.

8. A receive-side transmission control device to receive data at a data utilization point from a plurality of data generator devices at data generating points by way of a plurality of transmit-side transmission control devices, comprising:
   a processing unit and a memory unit,
   wherein the memory unit retains an allowable data transmission quantity set in the plurality of respective transmit-side transmission control devices,
   wherein the processing unit reallocates the allowable data transmission quantities among the transmit-side transmission control devices to fit within the data processing load range within the data utilization point upon receiving a request to change the allowable transmission data quantity, and notifies the corresponding transmit-side transmission control devices of the reallocated allowable data transmission quantities.

9. The receive-side transmission control device according to claim 8, wherein
the allowable data transmission quantity change request is a request from an optional device within the data utilization point, to change the allowable data transmission quantity of at least one of the plurality of transmit-side transmission control devices.

10. The receive-side transmission control device according to claim 8, wherein
the allowable data transmission quantity change request is a request received from an optional device within the data generating point, to change the allowable data transmission quantity; and that is sent by the transmit-side transmission control device.

11. A transmit-side transmission control device to transfer data generated by a plurality of data generator devices at data generating points to a data utilization device at a data utilization point, comprising:
a processing unit and a memory unit,
wherein the memory unit retains an allowable data transmission quantity of the applicable transmit-side transmission control device that was notified from the data utilization point side, and
wherein the processing unit adjusts the data transmission quantity sent from the data generator device so as to fit the data transmission quantity within the range of the retained allowable transmission data quantity,
generates a request to change the allowable transmission data quantity based on a transfer need request from a data generator device among the data generating points, and
sends the request to change the allowable transmission data quantity of the data utilization point side.

12. The transmit-side transmission control device according to claim 11, wherein
the processing unit transfers a portion of the data that was transferred from the data generator device and discards a portion so that the data transmission quantity is within the range of the allowable data transmission quantity retained in the memory unit.

13. The transmit-side transmission control device according to claim 11,
wherein the data generator device is a camera device that captures images, and
wherein the processing unit transfers a portion of the image data that was transferred from the camera device and discards a portion so that the data transmission quantity is within the range of the allowable data transmission quantity retained in the memory unit.

14. The transmit-side transmission control device according to claim 11,
wherein the data generator device is a camera device that captures images, and
wherein the processing unit converts the resolution of the image data that was transferred from the camera device so that the data transmission quantity is within the range of the retained allowable data transmission quantity.

15. The transmit-side transmission control device according to claim 11,
wherein the data generator device is a camera device that captures images, and
wherein the processing unit processes the image data from the camera device, and sets camera device importance level information and, when the importance level information has changed, the processing unit sends an allowable data transmission quantity change request to the data utilization point side.

16. The transmit-side transmission control device according to claim 11,
wherein the data generator device is a camera device that captures images, and
wherein the processing unit sets the camera device importance level information based on information detected from a sensor node installed for the corresponding camera device and when the importance level information has changed, the processing unit sends an allowable data transmission quantity change request to the data utilization point side.

17. The transmit-side transmission control device according to claim 16, wherein
the sensor node includes an infrared node installed in the vicinity of the camera device and, a mobile node capable of infrared communication with the infrared node.

* * * * *